United States Patent
Kwon et al.

(10) Patent No.: US 11,441,695 B1
(45) Date of Patent: Sep. 13, 2022

(54) SAFETY OPENING/CLOSING VALVE FOR EASY CHECKING OF OPENED/CLOSED STATE THEREOF

(71) Applicant: POLYTEC Co., Ltd, Cheongju-si (KR)

(72) Inventors: Gu Seob Kwon, Sejong-si (KR); Jung Hyun Choi, Cheongju-si (KR)

(73) Assignee: POLYTEC Co., Ltd, Cheongju-si (KR)

( * ) Notice: Subject to any disclaimer, the term of this patent is extended or adjusted under 35 U.S.C. 154(b) by 0 days.

(21) Appl. No.: 17/371,065

(22) Filed: Jul. 8, 2021

(30) Foreign Application Priority Data

Jun. 18, 2021 (KR) .......... 10-2021-0079180

(51) Int. Cl.
*F16K 31/53* (2006.01)
*F16K 27/02* (2006.01)

(52) U.S. Cl.
CPC ........ *F16K 31/535* (2013.01); *F16K 27/0245* (2013.01)

(58) Field of Classification Search
CPC .............. F16K 31/535; F16K 37/0058; Y10T 137/8292
See application file for complete search history.

(56) References Cited

U.S. PATENT DOCUMENTS

| | | | | |
|---|---|---|---|---|
| 1,756,650 A | * | 4/1930 | Martin, Jr. ............ | F16K 31/535 475/349 |
| 2,025,244 A | * | 12/1935 | Morehead ............. | F16K 31/535 475/342 |
| 2,767,681 A | * | 10/1956 | Pontius ............... | F16K 37/0016 137/553 |
| 3,505,972 A | * | 4/1970 | Benjamin ........... | F16K 37/0016 137/553 |
| 4,093,180 A | * | 6/1978 | Strabala ............... | F16K 31/535 475/158 |
| 4,783,885 A | * | 11/1988 | Bory ....................... | F16K 31/60 403/330 |
| 4,792,116 A | * | 12/1988 | Huber, Jr. ................ | F16K 1/24 251/232 |

(Continued)

FOREIGN PATENT DOCUMENTS

| | | |
|---|---|---|
| KR | 10-0257219 B1 | 5/2000 |
| WO | WO-2015080616 A1 * | 6/2015 ........... F16K 31/535 |

OTHER PUBLICATIONS

English Machine Translation of WO2015/080616 (Year: 2015).*

*Primary Examiner* — Reinaldo Sanchez-Medina
*Assistant Examiner* — Nicole Gardner
(74) *Attorney, Agent, or Firm* — Revolution IP, PLLC

(57) ABSTRACT

A safety opening/closing valve for easy checking of an opened/closed state thereof includes: a ball valve part having a rotating shaft part configured to open and close a flow path of the ball valve part by rotating; a housing part having an upper surface and having a plurality of gear teeth vertically formed along the inner circumference of an inner space of the housing part; a rotating part arranged in the housing part such that the rotating part rotates relative to the central axis of the housing part; at least three satellite gear parts mounted rotatably to the upper portion of the rotating part while being in engagement with gear teeth formed at the inner circumference of the housing part; a driving part including a sun gear part provided as a bar shape and inserted through an open central area of a top surface of the housing part.

5 Claims, 3 Drawing Sheets

(56) References Cited

U.S. PATENT DOCUMENTS

| | | | | |
|---|---|---|---|---|
| 5,769,118 | A * | 6/1998 | Lenberg | G05G 1/08 |
| | | | | 137/553 |
| 6,302,132 | B1 * | 10/2001 | Lay | F16K 27/067 |
| | | | | 251/315.1 |
| 2016/0153581 | A1 * | 6/2016 | Giubertoni | F16K 31/60 |
| | | | | 137/553 |
| 2020/0408330 | A1 * | 12/2020 | Takeda | F16K 31/607 |

* cited by examiner

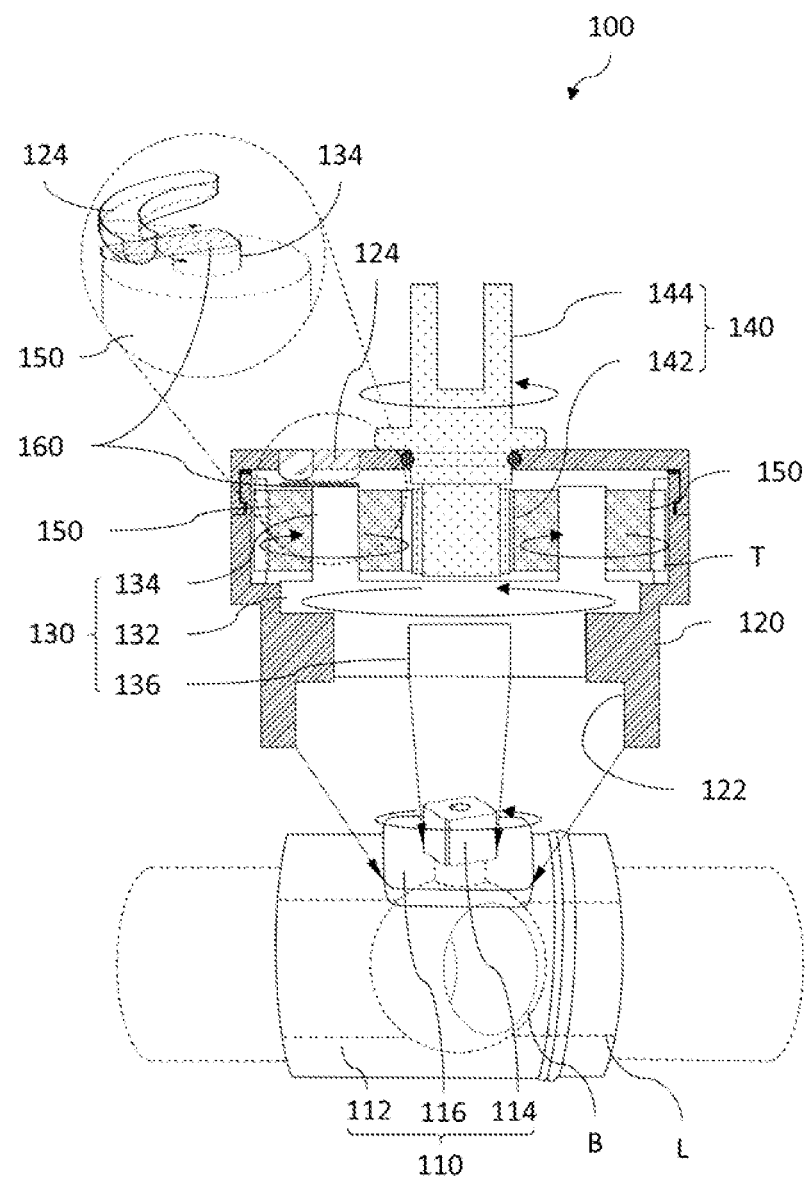
[FIG. 1]

[FIG. 2]
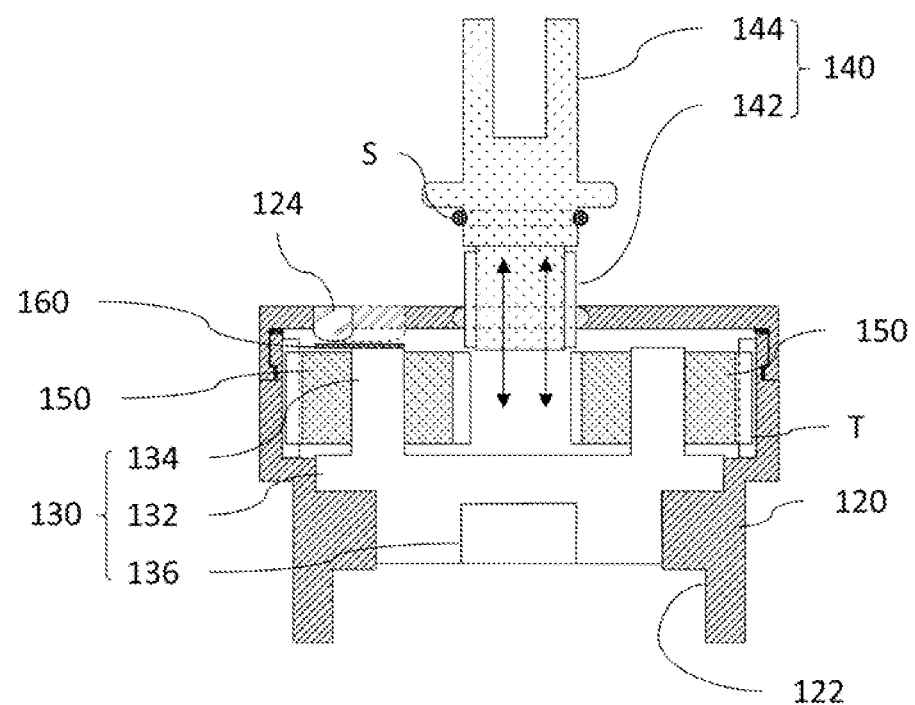

[FIG. 3]
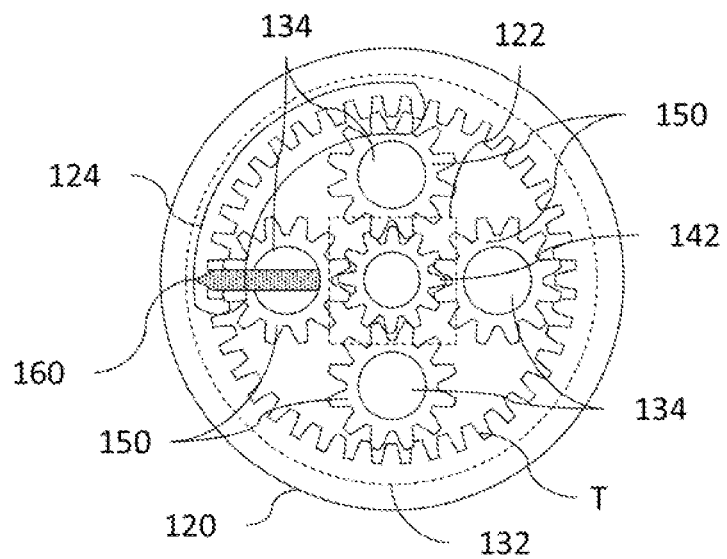
(a)
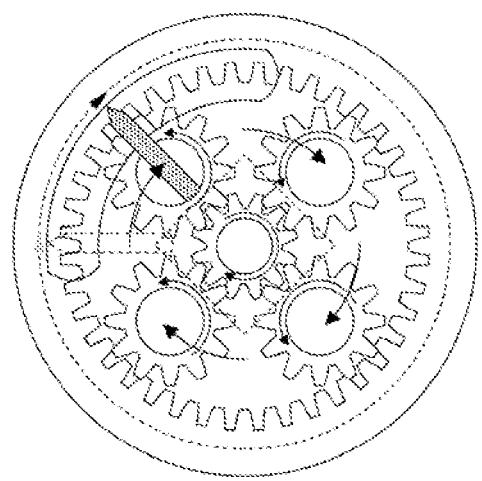
(b)

SAFETY OPENING/CLOSING VALVE FOR EASY CHECKING OF OPENED/CLOSED STATE THEREOF

CROSS REFERENCE TO RELATED APPLICATION

The present application claims priority to Korean Patent Application No. 10-2021-0079180, filed Jun. 18, 2021, the entire contents of which is incorporated herein for all purposes by this reference.

BACKGROUND OF THE INVENTION

Field of the Invention

The present disclosure relates to a safety opening/closing valve for easy checking of an opened/closed state thereof.

Description of the Related Art

A pipe is used to transmit a fluid such as gas or liquid to a place of use.

Generally, a supplier which supplies a fluid supplies the fluid to a plurality of the places of use by connecting a plurality of pipes to each other in the form of a grid. In a case in which the pipes are exposed to the ground, safety problems and unsightly appearance are caused, so the pipes are buried underground to interconnect the supplier and the places of use.

However, when fluid transfer in a specific section is stopped due to the replacement of a pipe, a lever of a valve buried in the ground along with the pipe is required to be manipulated through a rotating means having the form of a pole. However, a lot of force is required to manipulate the lever of the valve that has been opened or closed for a long time. Furthermore, it is difficult to accurately transmit a force to the lever located far away from the pole-shaped rotating means therethrough. Additionally, although the lever is manipulated through the rotating means, there is a problem that the lever or the valve may be damaged by excessive force applied thereto.

To solve these problems, an opening and closing driving device technology is disclosed in Korean Patent No. 10-0257219 (filed on Oct. 23, 1997, and published on Feb. 29, 2000, hereinafter, referred to as "a conventional technology") in which a plurality of gears having different gear ratios or diameters and arranged horizontally to each other inside engage with each other such that a lever can be easily rotated even with a small force by increasing a force applied to the opening and closing of a valve.

However, in the conventional technology, the lever (or a rotation shaft) of the valve and a drive shaft that transmits a rotational force to the lever are arranged in misalignment with each other in a vertical direction. Accordingly, when pressure is applied vertically downward from the rotation means when performing the opening and closing of the valve through the rotating means located far away from the valve as described above, there is a problem that the opening and closing of the valve may not be efficiently performed and the opening and closing driving device may be damaged. Accordingly, it is difficult to check the open/closed state of the valve, so there is a problem that the valve may also be damaged due to the continuous application of the rotational force to the valve in a maximum opening/closing limit area.

SUMMARY OF THE INVENTION

Accordingly, the present disclosure has been made keeping in mind the above problems occurring in the related art, and the present disclosure is intended to propose a safety opening/closing valve in which a flow path is opened and closed even by small force, damage to a component due to force applied thereto for a rotational operation of the component is prevented, and an opened/closed state thereof is easily checked.

In order to achieve the above objective, according to an embodiment of the present disclosure, there is provided a safety opening/closing valve for easy checking of an opened/closed state thereof, the valve including: a ball valve part comprising: a body part having a flow path formed therein, and a rotating shaft part exposed to an upper side of the body part at a portion thereof and configured to open and close the flow path by rotating; a housing part being opened at central areas of upper and lower surfaces thereof and configured in a shape of a cylinder having an inner space, the housing part having a plurality of gear teeth formed vertically along an inner circumference of the inner space of the housing part and having a fixing part formed at a lower portion of the housing part such that the fixing part is fixed to an upper portion of the body part; a rotating part comprising: a disk-shaped plate part arranged in the housing part such that the plate part rotates relative to a central axis of the housing part, at least three protrusions formed on an upper surface of the plate part by protruding vertically upward therefrom such that the at least three protrusions are arranged at same intervals along a circumferential direction of the plate part by being spaced apart by predetermined distances from a center of the plate part, and an insertion part having an insertion groove formed at a lower surface of the plate part, the upward exposed portion of the rotating shaft part being inserted and fixed to the insertion groove of the insertion part; a driving part comprising: a sun gear part configured to have a rod shape and inserted through an open central area of a top surface of the housing part, the sun gear part having a plurality of gear teeth formed along a circumference of a lower portion of the sun gear part located in the housing part, and a coupling part coupled with a rotating means configured to supply a rotational force thereto, the rotating means being coupled to an upper portion of the coupling part directed toward an upper outside of the housing part; at least three satellite gear parts fitted over the protrusions, respectively, each of the three satellite gear parts having gear teeth engaging with the gear teeth formed at the inner circumference of the housing part and the gear teeth of the sun gear part, wherein when the driving part is rotated by the rotational force supplied from the rotating means, the satellite gear parts rotate along the inner circumference of the housing part, with the gear teeth of the satellite gear parts engaging with the plurality of gear teeth formed at the inner circumference of the housing part, and transmit the rotational force to the protrusions so as to rotate the rotating part; and a bar-shaped display part coupled to an upper portion of at least one of the at least three protrusions and configured to move while drawing an arc according to the rotation of the rotating part, wherein an arc-shaped transparent part made of a transparent material is provided at an area of an upper surface of the housing part corresponding to a trajectory of the movement of the display part.

Here, the ball valve part may further include a protruding part formed at an upper portion of the body part adjacent to the rotating shaft part, wherein the protruding part has a height lower than a height of the exposed portion of the rotating shaft part, has a polygonal shape, and is formed by protruding upward from the upper portion from the body part.

In addition, in a state in which the rotating shaft part of the ball valve part is inserted in the insertion part of the rotating part, the fixing part may be fixed to the protruding part by covering a side surface of the protruding part, so the housing part may be horizontally fixed to the upper portion of the body part.

Additionally, the rotating shaft part may be rotated together with the rotating part by the rotational force transmitted from the coupling part such that the flow path is opened and closed, the rotating part being configured to rotate in the inner space of the housing part fixed horizontally to the upper portion of the body part.

Furthermore, the transparent part may be configured in a shape of a convex lens in which a central portion of a lower surface of the transparent part facing the display part relative to a longitudinal direction of the transparent part protrudes more downward than outer portions of the lower surface of the transparent part.

In the safety opening/closing valve for easy checking of an opened/closed state thereof according to the present disclosure, when the sun gear part is rotated by a rotational force supplied from the rotating means, the plurality of satellite gear parts engaging with gear teeth formed at the inner circumference of the housing part rotate the rotating part in a rotation ratio lower than the rotation ratio of the sun gear part, whereby the flow path of the ball valve part can be opened and closed even with small force and the opened/closed degree of the flow path can also be adjusted precisely, and the display part moves while drawing an arc according to the rotation of the rotating part and thus the degree of the rotation of the rotating part, that is, the opened/closed degree of the ball valve part is displayed by being enlarged at the outside of the housing part, thereby enabling a worker to manipulate the opening/closing of the ball valve part while checking the opened/closed state of the flow path even at the outside and preventing damage to the ball valve part due to an opening/closing operation of the ball valve part performed with excessive force.

In addition, in the safety opening/closing valve for easy checking of an opened/closed state thereof according to the present disclosure, the driving part is removably coupled to the housing part, so even if the sun gear part is damaged and the coupling part is damaged by the rotating means during the opening/closing process of the flow path, the driving part can be easily removed from the housing part to be replaced with a new one, thereby facilitating the replacement and maintenance of the driving part.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 approximately illustrates a safety opening/closing valve for easy checking of an opened/closed state thereof according to the exemplary embodiment of the present disclosure;

FIG. 2 illustrates an example of the replacement of a driving part by removing the driving part from the safety opening/closing valve for easy checking of an opened/closed state thereof according to the exemplary embodiment of the present disclosure; and FIG. 3 illustrates (A) and (B) showing the gradual rotational opening/closing operation of the safety opening/closing valve for easy checking of an opened/closed state thereof according to the exemplary embodiment of the present disclosure.

DETAILED DESCRIPTION OF THE INVENTION

Hereinafter, an embodiment of the safety opening/closing valve for easy checking of an opened/closed state thereof (hereinafter, referred to as "the safety opening/closing valve") of the present disclosure will be described in detail with reference to the accompanying drawings.

The same reference numerals in each figure indicate the same elements. In addition, specific structural or functional descriptions of the embodiments of the present disclosure are only exemplified for the purpose of describing the embodiments according to the present disclosure, and, unless otherwise defined, all terms used herein have the same meanings as commonly understood by those skilled in the art to which the present disclosure pertains. Terms such as those defined in a commonly used dictionary should be interpreted as having meanings consistent with meanings in the context of the related art, and it is preferable that the terms should not be interpreted as having ideal or excessively formal meanings unless explicitly defined in the present specification.

FIG. 1 approximately illustrates a safety opening/closing valve for easy checking of an opened/closed state thereof according to the exemplary embodiment of the present disclosure.

Referring to FIG. 1, in the safety opening/closing valve 100 according to the exemplary embodiment of the present disclosure, a rotating part receives a rotational force from a rotating means (not shown) so as to open and close the flow path L, and rotates at a rotation speed lower than a rotation speed caused by the rotational force supplied from the rotating means (not shown). The safety opening/closing valve 100 requires small force for the opening and closing the flow path L, and may include a ball valve part 110, a housing part 120, the rotating part 130, a driving part 140, satellite gear parts 150, and a display part 160.

The ball valve part 110 may include a body part 112 having the flow path L formed therein; a rotating shaft part 114 exposed to the upper side of the body part 112 at an area thereof, the rotating shaft part 114 rotating so as to rotate a ball B having a through hole formed therein in a forward or reverse direction within a rotation radius of 90 degrees such that the flow path L is opened or closed; and a protruding part 116 formed at an upper portion of the body part 112 adjacent to the rotating shaft part 114, wherein the protruding part 116 has height lower than the height of the exposed portion of the rotating shaft part 114, has a polygonal shape, and is formed by protruding upward from the upper portion of the body part 112.

Here, the upward exposed portion of the rotating shaft part 114 is preferably configured to have a polygonal column shape, and an insertion part 136 of the rotating part 130 to be described later may also be configured to have an insertion groove formed therein, the insertion groove corresponding to the shape of the upward exposed portion of the rotating shaft part 114.

The housing part 120 is coupled to the upper portion of the ball valve part 110, and receives the rotating part 130, a portion of the driving part 140, the four satellite gear parts 150, and the display part 160 to be described later. The housing part 120 is opened at central areas of upper and lower surfaces thereof and is configured in the shape of a cylinder having inner space in which components or some of the components described above are received. The housing part 120 may include a plurality of gear teeth T vertically formed along the inner circumference of the inner space of the housing part 120, and a fixing part 122 formed at a lower portion of the housing part 120 such that the fixing part 122 is fixed to an upper portion of the body part 112 of the ball valve part 110.

Here, in a state in which the rotating shaft part 114 of the ball valve part 110 is inserted in the insertion part 136 of the rotating part 130, the fixing part 122 is fixed to the protruding part 116 by covering the side surface of the protruding part 116, whereby in a state in which the central axes of the rotating shaft part 114, the rotating part 130, and the driving part 140 to be described later are vertically in alignment with each other, the fixing part 122 can be horizontally fixed to the upper portion of the body part 112.

The rotating part 130 may include: a disk-shaped plate part 132 arranged in the housing part 120 such that the plate part 132 rotates relative to the central axis of the housing part 120; at least three protrusions 134 formed on an upper surface of the plate part 132 by protruding vertically upward therefrom such that the three protrusions are arranged at the same intervals along a circumferential direction of the plate part by being spaced apart by predetermined distances from a center of the plate part 132; and the insertion part 136 having the insertion groove formed at a lower surface of the plate part 132, the upward exposed portion of the rotating shaft part 114 being inserted and fixed to the insertion groove of the insertion part.

Here, in a case in which the protrusions 134 are provided to include three protrusions, the three protrusions 134 may be formed on the upper surface of the plate part 132 such that three protrusions 134 are arranged at 120 degree intervals at the same distances from the central axis of the plate part 132. The protrusions 134 allow the satellite gear parts 150 to be described later to be fitted thereover and may help the axial rotations of the satellite gear parts 150. In the safety opening/closing valve 100 according to the exemplary embodiment of the present disclosure, the rotating part 130 is described to have only four protrusions 134. In this case, the four protrusions 134 may be formed on the upper surface of the plate part 132 by protruding therefrom such that the four protrusions 134 are arranged at 90 degree intervals at the same distances relative to the central axis of the plate part 132.

In addition, the insertion part 136 is located at a center of the lower surface of the plate part 132 and may be configured to have the insertion groove corresponding to the shape of the rotating shaft part 114. In other words, when the rotating part 130 rotates relative to the central axis thereof in a state in which the central axis of the rotating part 130 and the rotational axis of the rotating shaft part 114 of the ball valve part 110 are vertically in alignment with each other, the insertion part 136 allows the housing part 120 to be fixed horizontally to the protruding part 116 of the ball valve part 110, whereby the rotational force is completely transmitted to the rotating shaft part 114, so the rotating shaft part 114 can be rotated.

FIG. 2 illustrates an example of the replacement of a driving part by removing the driving part from the safety opening/closing valve for easy checking of an opened/closed state thereof according to the exemplary embodiment of the present disclosure.

Referring to FIGS. 1 and 2, the driving part 140 may include: a sun gear part 142 configured to have a rod shape and inserted through the open central area of the top surface of the housing part 120, the sun gear part 142 having the plurality of gear teeth formed along a circumference of a lower portion of the sun gear part 142 located in the housing part 120; and a coupling part 144 allowing the rotating means (not shown) supplying a rotational force thereto to be coupled to an upper portion of the coupling part 144 directed toward an upper outside of the housing part. Referring to FIG. 2, the sun gear part 142, which has the plurality of gear teeth formed therein, of the driving part 140 is provided to have a diameter smaller than the diameter of the open central area of the top surface of the housing part 120, and an area between the coupling part 144 and the sun gear part 142 is provided to have a diameter larger than the diameter of the open central area of the top surface of the housing part 120, whereby with the sun gear part 142 located in the housing part 120, the driving part 140 may be inserted and coupled to the housing part 120.

In this case, the diameter of the sun gear part 142 is smaller than the diameter of the open central area of the top surface of the housing part 120. Accordingly, when the lower part of the driving part 140 which is the sun gear part 142 is inserted through the housing part 120, the sun gear part 142 may be located in the housing part 120 without interfering with the housing part 120, and the area between the sun gear part 142 and the coupling part 144 which is configured to have a diameter larger than the diameter of the open central area of the top surface of the housing part 120 is located to cover the open central area of the top surface of the housing part 120, so water or contaminants can be prevented from penetrating to space between the driving part 140 and the open central area of the top surface of the housing part 120.

Furthermore, a soft sealing member S may be fitted over and coupled to a lower circumference of the area having a diameter larger than the diameter of the open central area of the top surface of the housing part 120. In this case, a groove corresponding to the shape of the sealing member S may be formed at a side surface of the open central area of the top surface of the housing part 120. When the lower part of the driving part 140 is inserted through the open central area of the top surface of the housing part 120 such that the sun gear part 142 is located in the housing part 120, the sealing member S is held in the groove formed at the side surface of the open central area of the top surface of the housing part 120, so the vertical position of the sun gear part 142 is fixed and the airtightness of an area between the driving part 140 and the housing part 120 is increased.

In addition, the sealing member S is made of a soft material and may partially be changed in shape by pressing force. Accordingly, the sealing member S may be removed from the groove formed at the side surface of the open central area of the top surface of the housing part 120 by pulling the driving part 140 upward by applying a predetermined force thereto. The coupling of the driving part 140 to the housing part 120 by using such a sealing member S made of a soft material is performed such that when the coupling part 144 is damaged by a strong force applied temporarily to the coupling part 144 or by a force applied repeatedly for a long period of time thereto in a process in which a worker applies a rotational force to the driving part 140 by coupling the rotating means (not shown) to the coupling part 144 for the opening and closing of the flow path L, the driving part 140 is easily replaced. In this case, the worker pulls upward the driving part 140 in which the coupling part 144 is damaged and removes the driving part 140 from the housing part 120, and press-fits a driving part 140 to replace with to the housing part 120. Accordingly, in a relatively simple method, the worker can easily replace the driving part 140 with a new driving part. In this case, a strip-shaped protruding or recessed gripping area (not shown) may be formed at a portion of the circumference of the driving part 140 which corresponds to the lower part of the coupling part 144 such that the driving part 140 can be gripped by a tool such as tongs.

FIGS. 3A and 3B illustrate the gradual rotational opening/closing operation of the safety opening/closing valve for easy checking of an opened/closed state thereof according to the exemplary embodiment of the present disclosure.

Referring to FIGS. 1, 3A, and 3B, the four satellite gear parts 150 are fitted over the protrusions 134 of the rotating part 130, respectively. Each of the four satellite gear parts 150 may be configured to include gear teeth formed thereat, the gear teeth engaging with gear teeth T formed at the inner circumference of the housing part 120 and the gear teeth of the sun gear part 142.

Here, when the driving part 140 is rotated by the rotational force supplied from the rotating means (not shown), the four satellite gear parts 150 rotate along the inner circumference of the housing part 120 with the gear teeth of the satellite gear parts 150 being in engagement with the plurality gear teeth T formed at the inner circumference of the housing part 120, and transmit a rotational force to the protrusions 134 so as to rotate the rotating part 130.

Referring to FIGS. 3A and 3B for more detailed description, as illustrated in FIG. 3A, the satellite gear parts 150 fitted over each of the protrusions 134 receive a rotational force from the sun gear part 142, the satellite gear parts 150 are not rotated on axes thereof by the gear teeth T formed along the inner circumference of the housing part 120, but as illustrated in FIG. 3B, while being in engagement with the gear teeth T therealong, the satellite gear parts 150 rotate while drawing an arc along the inner circumference of the housing part 120 relative to the sun gear part 142.

In this case, as each of the satellite gear parts 150 rotates while drawing an arc in the same direction, the four protrusions 134 receive the rotational force of the same direction as the rotating direction of the sun gear part 142 from the four satellite gear parts 150, and the four satellite gear parts 150 are not rotated on axes thereof but are rotated while drawing an arc by the rotational force transmitted from the sun gear part 142. Accordingly, the rotation ratio of the plate part 132 becomes lower than a rotation ratio caused by the rotational force supplied from the sun gear part 142, but a rotational force occurring during the rotation of the plate part 132 becomes stronger than a force applied to the sun gear part 142 for the rotation of the sun gear part 142, with the rotating means (not shown) being coupled to the coupling part 144.

That is, when the four satellite gear parts 150 rotate the plate part 132 by using the rotational force transmitted from the sun gear part 142, the rotation ratio of the plate part 132 is decreased. However, the plate part 132 can rotate the rotating shaft part 114 of the ball valve part 110 inserted into the insertion part 136 even with small force and enables a precise opening/closing control of the ball valve part 110.

The display part 160 is coupled to the upper portion of at least one of at least four protrusions 134 and may be configured in the shape of a bar moving while drawing an arc relative to a central axis of the plate part 132 according to the rotation of the rotating part 130. In this case, the housing part 120 may include an arc-shaped transparent part 124 provided at an area of the upper surface of the housing part 120 corresponding to a trajectory of the movement of the display part 160, the transparent part 124 being made of a transparent material. In this case, text and image indicating the opening/closing of the flow path of the ball valve part 110 according to the position of the display part 160 may be printed on the upper surface of the housing part 120 adjacent to the transparent part 124.

The display part 160 will be described with reference to FIG. 3A. As illustrated in FIG. 3A, when the rotating part 130 is rotated by the rotation of the driving part 140, the display part 160 coupled to the upper portion of a protrusion 134 located at the left side moves while drawing an arc according to the degree of the rotation of the rotating part 130, and can be checked through the transparent part 124 of the housing part 120 from the outside. In this case, the rotating shaft part 114 of the ball valve part 110 is rotated in a forward or reverse direction within a rotation radius of the range of 90 degrees, and the rotating part 130 connected to the rotating shaft part 114 through the insertion part 136 is also rotated only within the range of 90 degrees, so in a portion of the transparent part of the display part 160 checked through the transparent part 124 from the outside, the position of the display part 160 indicates the degree of the rotation of the rotating shaft part 114, that is, the opened/closed degree of the ball valve part 110.

In addition, the transparent part 124 is configured in the shape of a convex lens in which a central portion of the lower surface of the transparent part 124 facing the display part 160 relative to the longitudinal direction of an arc of the transparent part 124 protrudes more downward than outer portions of the lower surface, whereby the bar-shaped display part 160 can be seen through the transparent part 124 by being enlarged in a direction perpendicular to the longitudinal direction of the transparent part 124, so even when a worker visually checks the transparent part 124 at an upper portion of the housing part 120 in a vertical direction thereof and at a side surface of the upper portion thereof, the shape of the display part 160 can be clearly displayed.

In this case, reflective paint is applied on the upper surface of the display part 160 directed toward the transparent part 124 by forming a linear shape at a central portion of the display part 160 such that the reflective paint reflects a specific color of light introduced through the transparent part 124. When a small amount of light is introduced to the transparent part 124 from the outside through an area through which the rotating means (not shown) is introduced for the opening and closing of the flow path even if the safety opening/closing valve 100 according to the exemplary embodiment of the present disclosure is provided by being buried in the ground, application of the reflective paint on the display part 160 allows the display part 160 to reflect a specific color due to introduced light such that the visibility of the display part 160 for checking the position of the display part 160 through the transparent part 124 is increased.

That is, in the safety opening/closing valve for easy checking of an opened/closed state thereof according to the present disclosure, when the sun gear part is rotated by a rotational force supplied from the rotating means, the plurality of satellite gear parts engaging with gear teeth formed the inner circumference of the housing part rotate the rotating part in a rotation ratio lower than the rotation ratio of the sun gear part, whereby the flow path of the ball valve part can be opened and closed even with small force and the opened/closed degree of the flow path can also be adjusted precisely, and the display part moves while drawing an arc according to the rotation of the rotating part and thus the degree of the rotation of the rotating part, that is, the opened/closed degree of the ball valve part is displayed by being enlarged at the outside of the housing part, thereby enabling a worker to manipulate the opening/closing of the ball valve part while checking the opened/closed state of the flow path even at the outside and preventing damage to the ball valve part due to opening/closing operation of the ball valve part performed by a force more than necessary.

In addition, in the safety opening/closing valve for easy checking of an opened/closed state thereof according to the present disclosure, the driving part is removably coupled to the housing part, so even when the sun gear part is damaged and during the opening/closing process of the flow path, the coupling part is damaged by the rotating means, the driving part can be easily removed from the housing part to be replaced with a new one, thereby facilitating the maintenance of the driving part.

The above-described embodiment of the present disclosure has been disclosed for the purpose of illustration, and those skilled in the art with common knowledge about the present disclosure will be able to make various modifications, changes, and additions within the spirit and scope of the present disclosure, and such modifications, changes and additions should be regarded as belonging to the scope of the following patent claims.

What is claimed is:

1. A safety opening/closing valve for easy checking of an opened/closed state thereof, the valve comprising:
    a ball valve part comprising: a body part having a flow path formed therein, and a rotating shaft part exposed to an upper side of the body part at a portion thereof and configured to open and close the flow path by rotating;
    a housing part being opened at central areas of upper and lower surfaces thereof and configured in a shape of a cylinder having an inner space, the housing part having a plurality of gear teeth formed vertically along an inner circumference of the inner space of the housing part and having a fixing part formed at a lower portion of the housing part such that the fixing part is fixed to an upper portion of the body part;
    a rotating part comprising: a disk-shaped plate part arranged in the housing part such that the plate part rotates relative to a central axis of the housing part, at least three protrusions formed on an upper surface of the plate part by protruding vertically upward therefrom such that the at least three protrusions are arranged at same intervals along a circumferential direction of the plate part by being spaced apart by predetermined distances from a center of the plate part, and an insertion part having an insertion groove formed at a lower surface of the plate part, the upward exposed portion of the rotating shaft part being inserted and fixed to the insertion groove of the insertion part;
    a driving part comprising: a sun gear part configured to have a rod shape and inserted through an open central area of a top surface of the housing part, the sun gear part having a plurality of gear teeth formed along a circumference of a lower portion of the sun gear part located in the housing part, and a coupling part coupled with a rotating means configured to supply a rotational force thereto, the rotating means being coupled to an upper portion of the coupling part directed toward an upper outside of the housing part, wherein the coupling part is exposed outside of the housing part upon the sun gear part being inserted into the housing part;
    at least three satellite gear parts fitted over the protrusions, respectively, each of the three satellite gear parts having gear teeth engaging with the gear teeth formed at the inner circumference of the housing part and the gear teeth of the sun gear part, wherein when the driving part is rotated by the rotational force supplied from the rotating means, the satellite gear parts rotate along the inner circumference of the housing part, with the gear teeth of the satellite gear parts engaging with the plurality of gear teeth formed at the inner circumference of the housing part, and transmit the rotational force to the protrusions so as to rotate the rotating part; and
    a bar-shaped display part coupled to an upper portion of at least one of the at least three protrusions and configured to move while drawing an arc according to the rotation of the rotating part,
    wherein an arc-shaped transparent part made of a transparent material is provided at an area of an upper surface of the housing part corresponding to a trajectory of the movement of the display part,
    wherein, in the driving part and the housing part,
        a diameter of the sun gear part is smaller than a diameter of the open central area of the top surface of the housing part,
        a diameter of an area between the coupling part and the sun gear part is larger than the diameter of the open central area of the top surface of the housing part,
        the area between the coupling part and the sun gear part is located to cover the open central area of the top surface of the housing part upon the sun gear part being inserted into the housing part,
        a sealing member is coupled to a lower circumference of the area and has a diameter larger than the diameter of the open central area of the top surface of the housing part,
        a groove corresponding to a shape of the sealing member is formed at a side surface of the open central area of the top surface of the housing part, and
        the sealing member is held in the groove formed at the side surface of the open central area of the top surface of the housing part upon the sun gear part being inserted into the housing part.

2. The valve of claim 1, wherein the ball valve part further comprises a protruding part formed at an upper portion of the body part adjacent to the rotating shaft part, wherein the protruding part has a height lower than a height of the exposed portion of the rotating shaft part, has a polygonal shape, and is formed by protruding upward from the upper portion from the body part.

3. The valve of claim 2, wherein in a state in which the rotating shaft part of the ball valve part is inserted in the insertion part of the rotating part, the fixing part is fixed to the protruding part by covering a side surface of the protruding part, so the housing part is horizontally fixed to the upper portion of the body part.

4. The valve of claim 3, wherein the rotating shaft part is rotated together with the rotating part by the rotational force transmitted from the coupling part such that the flow path is opened and closed, the rotating part being configured to rotate in the inner space of the housing part fixed horizontally to the upper portion of the body part.

5. The valve of claim 1, wherein the transparent part is configured in a shape of a convex lens in which a central portion of a lower surface of the transparent part facing the display part relative to a longitudinal direction of the transparent part protrudes more downward than outer portions of the lower surface of the transparent part.

* * * * *